M. H. LINEBACK.
Seed-Planter.
No. 53,156.  Patented Mar. 13, 1866.
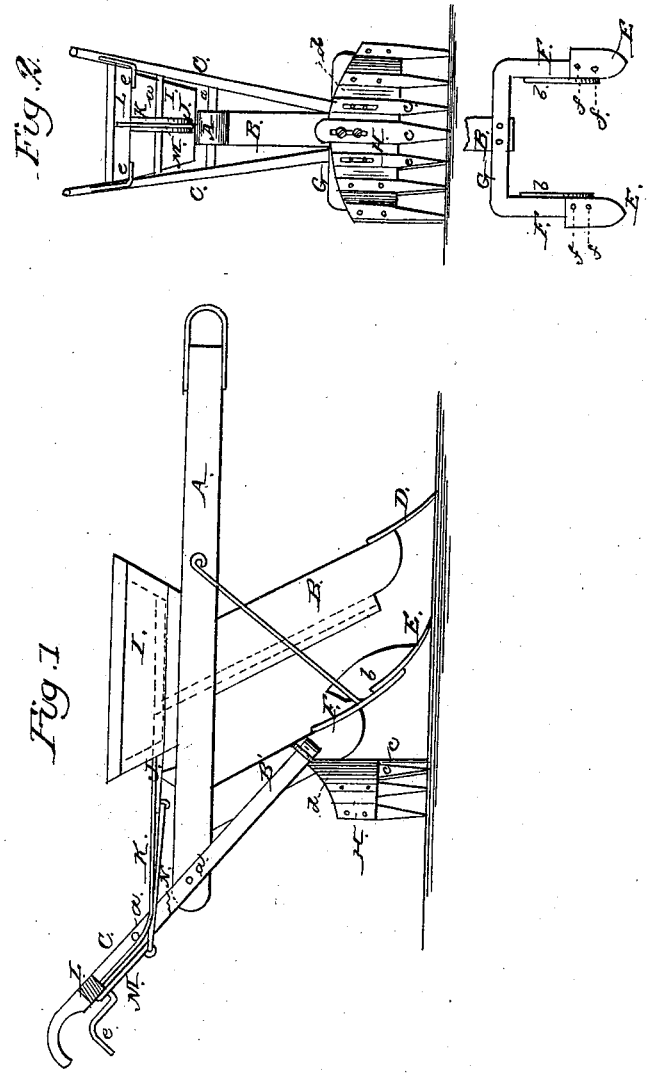
Witnesses:
Wm Trewen
Theo Tusch
Inventor:
M H Lineback
By Munn & Co.
attys

UNITED STATES PATENT OFFICE.

M. H. LINEBACK, OF GREENFIELD, INDIANA.

IMPROVEMENT IN CORN-PLANTER CULTIVATORS.

Specification forming part of Letters Patent No. 53,156, dated March 13, 1866.

*To all whom it may concern:*

Be it known that I, M. H. LINEBACK, of Greenfield, in the county of Hancock and State of Indiana, have invented a new and Improved Corn-Planter and Cultivator; and I do hereby declare that the following is a full, clear, and exact description thereof, which will enable others skilled in the art to make and use the same, reference being had to the accompanying drawings, forming part of this specification, in which—

Figure 1 is a side view of my invention; Fig. 2, a rear view of the same; Fig. 3, a detached front view of the two side plows pertaining to the same.

Similar letters of reference indicate like parts.

This invention relates to a new and improved implement or device for planting and cultivating corn; and it consists in a novel construction of plows and a rake or harrow and seed-distributing device, as hereinafter fully shown and described, whereby the work both of planting and plowing corn may be performed in a perfect manner.

A represents a beam having two inclined standards, B B', attached, and provided at its rear part with two handles, C C, the lower ends of which are attached to the lower end of the rear standard, B', and connected by cross-bars $a$, the lower one of which passes through the rear part of the beam.

To the lower end of the front standard, B, the front plow, D, is attached by bolts or other means which will admit of said plow being readily detached when required, and E E are two side plows attached by bolts $ff$ to the lower ends of arms F at the ends of a cross-bar, G, the latter being attached to the lower end of the rear standard, B'. The cross-bar G and arms F F may all be formed in one piece. These side plows, E E, are provided at one side with a flange, $b$, which extends forward at right angles with the fronts or faces of said plows, (see Figs. 1 and 3,) and at the rear of the standard B' there is secured a rake or harrow, H, of semicircular form, its convex surface facing the front end of the plow. This rake or harrow is attached to the rear standard in such a manner that it may be adjusted higher or lower, as desired, and its central teeth, $c$, (three, more or less,) are attached to the head $d$ in such a manner as to admit of a separate or independent adjustment, higher or lower, as may be required. (See Fig. 2.)

I represents a seed-box, which is placed on the beam A just above or over the front standard, B, and has a slide, J, fitted in its bottom. This slide is perforated to form a seed-cell, and its rear end, at the outer side of the seed-box, has a spring, K, attached to it, which may be of metal or any suitable hard elastic wood.

The outer end of the spring K is attached to a shaft, L, fitted between the upper parts of the handles, and this shaft L has a pendent bar, M, attached, the lower end of which is connected by a rod, N, with the rear end of the seed-slide.

The spring K has a tendency to keep the slide J pressed into the seed-box, and the slide is drawn outward therefrom by the operator, who actuates the shaft L through the medium of handles $e$ attached thereto. By these means a reciprocating motion is given the slide J and the seed dropped down through the pendant B into the furrow made by the plow D.

When the device is used as a cultivator for plowing small corn the front plow, D, is detached and the side plows, E E, have the flanges $b$ at their inner sides to prevent clods of earth being cast on the corn. The rake or harrow H always throws off any lumps or clods which may chance to be on the corn, the central teeth of rake or harrow being adjusted sufficiently high, so as not to injure the corn.

In planting corn the side plows, E E, are reversed, the right-hand one being attached to the left-hand side of the plow, and vice versa, so that the flanges $b$ will be at the outer sides to assist in covering the corn.

I claim as new and desire to secure by Letters Patent—

The spring K, when arranged and applied to the seed-slide J and used in connection with the shaft L, provided with handles, and also connected with the seed-slide J, substantially as described.

MARTIN H. LINEBACK.

Witnesses:
N. P. HOWARD,
A. T. HART.